United States Patent
Xu

(10) Patent No.: US 10,451,479 B2
(45) Date of Patent: Oct. 22, 2019

(54) MULTICHANNEL ULTRA-SENSITIVE OPTICAL SPECTROSCOPIC DETECTION

(71) Applicant: The Curators of the University of Missouri, Columbia, MO (US)

(72) Inventor: Zhi Xu, St. Louis, MO (US)

(73) Assignee: The Curators of the University of Missouri, Columbia, MO (US)

(*) Notice: Subject to any disclaimer, the term of this patent is extended or adjusted under 35 U.S.C. 154(b) by 0 days.

(21) Appl. No.: 15/761,488

(22) PCT Filed: Nov. 9, 2016

(86) PCT No.: PCT/US2016/061046
§ 371 (c)(1),
(2) Date: Mar. 20, 2018

(87) PCT Pub. No.: WO2017/083325
PCT Pub. Date: May 18, 2017

(65) Prior Publication Data
US 2018/0266884 A1    Sep. 20, 2018

Related U.S. Application Data

(60) Provisional application No. 62/254,006, filed on Nov. 11, 2015.

(51) Int. Cl.
*G01J 3/18* (2006.01)
*G01J 3/28* (2006.01)
*G01J 3/12* (2006.01)

(52) U.S. Cl.
CPC ............. *G01J 3/1804* (2013.01); *G01J 3/28* (2013.01); *G01J 3/2803* (2013.01);
(Continued)

(58) Field of Classification Search
CPC .......... G01J 3/1804; G01J 3/28; G01J 3/2803; G01J 2003/123; G01J 3/1239; G01J 3/2866
See application file for complete search history.

(56) References Cited

U.S. PATENT DOCUMENTS 5,926,283 A    7/1999   Hopkins
6,421,179 B1 * 7/2002  Gutin ...................... G01J 3/02
                                                    359/572
(Continued)

OTHER PUBLICATIONS

International Search Report and Written Opinion of application PCT/US2016/061046, dated Jan. 5, 2017; 10 pages.

*Primary Examiner* — Hina F Ayub
(74) *Attorney, Agent, or Firm* — Stinson LLP

(57) ABSTRACT

Increased sensitivity of spectrometers through reducing noise in independent voltage signals via a differential voltage analyzer utilizing a reference wavelength from a wavelength region in which the optical absorption of the sample is negligible. In an embodiment, a grating permits selection of a reference wavelength. In another embodiment, filters permit selection of a reference wavelength. In yet another embodiment, both a grating and a filter permit selection of a reference wavelength. In an aspect, the differential voltage analyzer reduces noise by minimizing a differential voltage between the independent voltage signals and the reference voltage signal by adjusting the value of a cancellation coefficient.

20 Claims, 11 Drawing Sheets

(52) U.S. Cl.
CPC . *G01J 2003/123* (2013.01); *G01J 2003/1239* (2013.01); *G01J 2003/2866* (2013.01)

(56) References Cited

U.S. PATENT DOCUMENTS

| | | |
|---|---|---|
| 6,490,533 B2 | 12/2002 | Weiner et al. |
| 2002/0122246 A1* | 9/2002 | Tearney ............. A61B 1/00096 359/368 |
| 2004/0258419 A1* | 12/2004 | Xu ......................... H03F 1/083 398/182 |
| 2005/0243312 A1 | 11/2005 | Geshwind et al. |
| 2005/0265732 A1* | 12/2005 | Jennen ................. H04B 10/675 398/186 |
| 2005/0270528 A1 | 12/2005 | Geshwind et al. |
| 2007/0195320 A1* | 8/2007 | Sriram ...................... G01J 3/02 356/301 |
| 2010/0201963 A1* | 8/2010 | Cramer .................... G01J 3/18 355/67 |
| 2013/0265568 A1 | 10/2013 | Micheels et al. |
| 2015/0369664 A1* | 12/2015 | Garsha ...................... G01J 3/10 356/402 |
| 2017/0047709 A1* | 2/2017 | Hodgkinson ....... H01S 5/02415 |

* cited by examiner

MULTICHANNEL ULTRA-SENSITIVE OPTICAL SPECTROSCOPIC DETECTION

CROSS-REFERENCE TO RELATED APPLICATIONS

This application is a national stage application of PCT/US2016/061046, filed Nov. 9, 2016, which claims priority from U.S. Provisional Patent Application Ser. No. 62/254,006, filed Nov. 11, 2015, entitled "Multichannel Ultra-Sensitive Optical Spectroscopic Detection," the entire contents of which are expressly incorporated herein by reference, including the contents and teachings of any references contained therein.

BACKGROUND

Aspects of the present invention generally relate to the field of optical spectrometers.

Miniature optical spectrometers based on linear silicon charge-coupled device (CCD) array detectors have several advantages over conventional benchtop scanning and/or Fourier Transfer Infrared (FTIR) spectrometers. Such advantages include compact size, robust optoelectronics, and short sampling times. Exemplary spectrometers based on linear silicon CCD arrays include USB4000 and USB2000 model spectrometers manufactured by Ocean Optics, Inc., Mini-spectrometers manufactured Hamamatsu Photonics K.K., BLACK-Comet model spectrometers manufactured by StellarNet, Inc., and SM240 model spectrometers manufactured by Spectral Products. However, conventional spectrometers based on linear silicon CCD array detectors also have disadvantages. Namely, they suffer from low sensitivity (e.g., only 250:1 for the USB2000 model spectrometer manufactured by Ocean Optics, Inc.).

SUMMARY

Aspects of the invention utilize a voltage differential to reduce noise in multichannel ultra-sensitive optical spectroscopic detection. In an embodiment, aspects of the invention offer 50 to 100 fold higher detection sensitivity than conventional CCD array based detectors. Aspects of the invention also include a multichannel ultra-sensitive optical spectroscopic detection system having a compact size, robust optoelectronics, and a short sampling time.

A system embodying aspects of the invention includes a reflective grating, an optical device, a multichannel array detector, and a differential voltage analyzer coupled to the multichannel array detector. The reflective grating is configured to angularly resolve a collimated light beam transmitted through, emitted from, scattered by, and/or reflected by a sample. The optical device is coupled to the reflective grating and configured to receive and focus the angularly resolved light beam. The multichannel array detector is configured to receive the focused light beam and output signals representative of a plurality of wavelength components of the light beam. The differential voltage analyzer is configured to output a differential voltage signal representative of each of the wavelength components relative to a noise reduction reference value.

Another system embodying aspects of the invention includes an optical device, one or more interference light filters, one or more light detectors, and a differential voltage analyzer coupled to each of the one or more light detectors. The optical device is configured to collimate a light beam transmitted through, emitted from, scattered by, and/or reflected by a sample. The interference light filters are each configured to receive the collimated light beam and selectively transmit one of a plurality of wavelength components of the light beam. The light detectors are each configured to receive one of the plurality of wavelength components of the light beam and output a signal representative of the received wavelength component. The differential voltage analyzer is configured to output a differential voltage signal representative of each of the wavelength components relative to a noise reduction reference value.

A method of identifying properties of a sample material embodying aspects of the invention includes collimating a light beam transmitted through, emitted from, scattered by, and/or reflected by the sample material. One or more specific wavelengths of light of the collimated light beam are detected. The method also includes generating a corresponding photocurrent signal for each of the specific wavelengths of light and converting each photocurrent signal into a corresponding independent voltage signal. The method includes generating a corresponding independent differential voltage signal for each independent voltage signal based on a proportional constant. The proportional constant corresponds to one or more of the independent voltage signal, a cancellation coefficient corresponding to the independent voltage signal, and a reference voltage.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
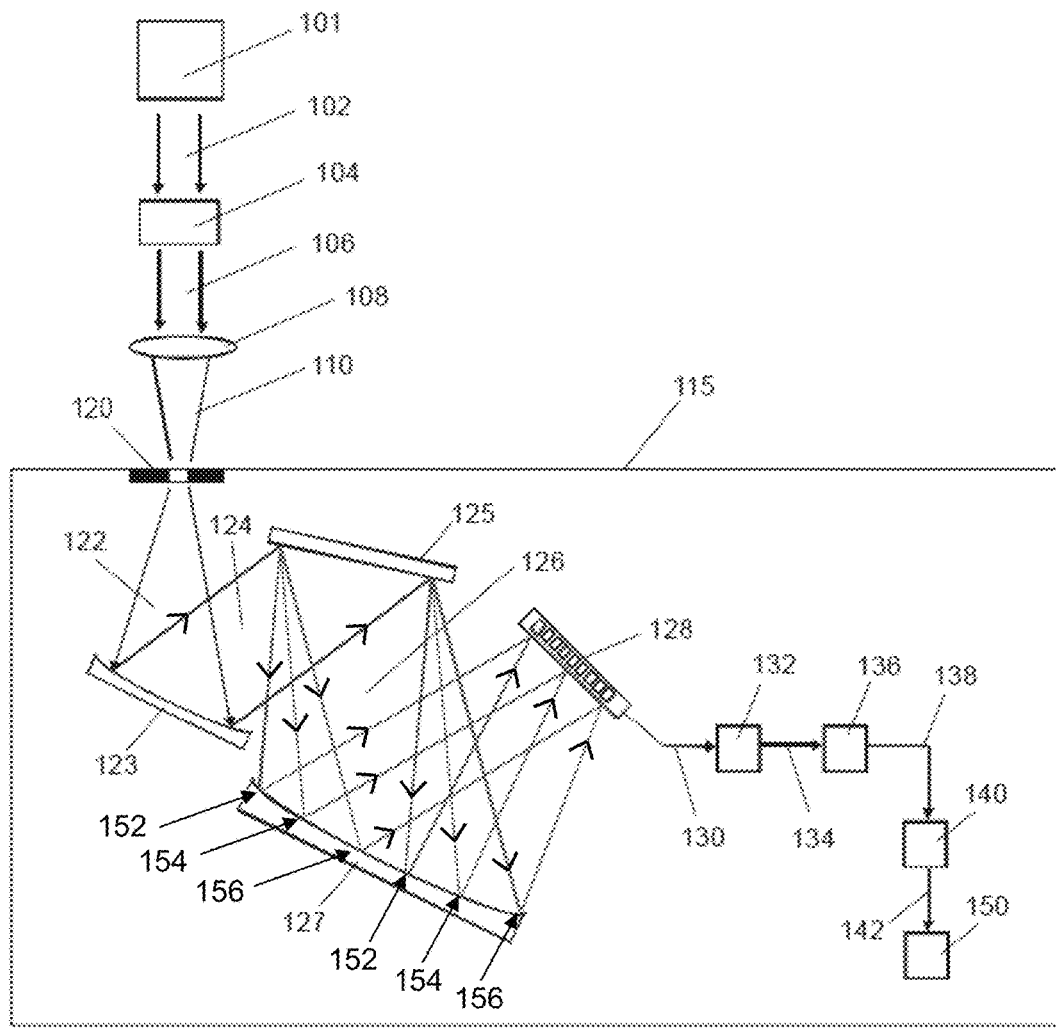
FIG. 1 illustrates an embodiment of a multichannel ultra-sensitive optical detection system including a grating, a focus mirror, a linear multichannel array detector, and a differential voltage analyzer.

FIG. 1 depicts a multichannel ultra-sensitive optical detection system 100. The system 100 includes a light source 101, an excitation light beam 102, a sample 104, light 106, a lens 108, a beam 110, and a detector 115. The detector 115 further includes an entrance slit 120, light 122, a reflective collimation mirror 123, a collimated light beam 124, a reflective grating 125, angularly resolved light beams 126, a focus mirror 127, a linear multichannel array detector 128, photocurrent signals 130, a low-noise preamplifier system 132, voltage signals 134, a low-noise differential voltage analyzer 136, differential voltage signals 138, a digitizer 140, digitized signals 142, and a computing device 150.

The light source 101 is adapted to provide electromagnetic radiation within a certain portion of the electromagnetic spectrum. In an exemplary embodiment, light source 101 is adapted to provide electromagnetic radiation having wavelengths in the range of 200-2000 nanometers. However, one skilled in the art will understand that light source 101 may provide electromagnetic radiation having any wavelength along the electromagnetic spectrum. Exemplary light sources include, but are not limited to electric arc discharges, gas discharge lamps, sources based on incandescence (e.g., incandescent light bulb, etc.), sources based on luminescence (e.g., light-emitting diodes, lasers, etc.), and the like. The excitation light beam 102 is the output of light source 101.

The sample 104 is adapted to interact with (e.g., transmit, emit, scatter, and/or reflect) all or a portion of excitation light beam 102 to result in light 106. In the exemplary embodiment of FIG. 1 and further described herein sample 104 is a liquid sample, but one having ordinary skill in the art will understand that similar procedures could be developed for solid samples and gas samples. In an embodiment, a cuvette filled with a reference solvent is placed at the same location as sample 104 and the baseline differential voltages $K_{iR}$ ($1 \le i \ne j \le N$) and the baseline reference voltage $V_{jR}$ are taken. The reference solvent in the cuvette is replaced with sample 104 (e.g., a sample solution) and the sample differential voltages $K_{iS}$ ($1 \le i \ne j \le N$) and the sample reference voltage $V_{jS}$ are taken. The transmittance, $T_i$, and absorbance, $A_i$, of the sample 104 at the wavelength $\lambda_i$ are obtained using Equations 1 and 2:

$$T_i = \left[\left(\frac{K_{iS}}{V_{jS}} + b_i\right) / \left(\frac{K_{iR}}{V_{jR}} + b_i\right)\right] \quad (1)$$

$$A_i = -\log\left[\left(\frac{K_{iS}}{V_{jS}} + b_i\right) / \left(\frac{K_{iR}}{V_{jR}} + b_i\right)\right] \quad (2)$$

The lens 108 is adapted to receive and focus light 106 onto the entrance slit 120. In the embodiment illustrated by FIG. 1, lens 108 is a convex lens, but one having ordinary skill in the art will understand that other types of lenses may be utilized. In an alternative embodiment, lens 108 is adapted to focus light 106 into a fiber optical connection (not shown) for transmission into the detector 115.

The array detector 128 is adapted to receive and convert the light power of angularly resolved beams 126 into photocurrent signals 130, as further described herein. The low-noise preamplifier system 132 is adapted to convert the photocurrent signals 130 into corresponding independent voltage signals 134, as further described herein. The low-noise differential voltage analyzer 136 is adapted to reduce the noise in the independent voltage signals 134 to result in the differential voltage signals 138, as further described herein. The digitizer 140 is adapted to convert the analog differential voltage signals 138 into digital form, such as digitized signals 142. In an exemplary embodiment, digitizer 140 is an analog-to-digital converter (ADC). The computing device 150 is adapted to process digitized signals 142 according to processor-executable instructions stored on a computer-readable medium of computing device 150. In the embodiment of FIG. 1, computing device 150 is a personal computer (PC), but one having ordinary skill in the art will understand that computing device 150 may be other devices including, but not limited to, laptops, tablet computers, mobile communication devices, smartphones, servers, and the like.

In operation of an exemplary embodiment of system 100, the light source 101 generates the excitation light beam 102. The excitation light beam 102 interacts with the sample 104. For example, such interaction may include all or a portion of excitation light beam 102 being transmitted through, emitted from, scattered by, and/or reflected by sample 104. The portion of light beam 102 transmitted through, emitted from, scattered by, and/or reflected by sample 104 comprises light 106. Light 106 is collected by the lens 108. At least a portion of light 106 collected by lens 108 is converted by lens 108 into the beam 110 and focused onto the entrance slit 120. The entrance slit 120 is mounted on detector 115. In an alternative embodiment, light 106 is coupled into the detector 115 via a fiber optical connection (not shown). After passing through the entrance slit 120, the light that comprised beam 110 is now referred to as light 122. Light 122 is collected (i.e., received) by an optical device such as the reflective collimation mirror 123 and becomes the collimated light beam 124. The collimated light beam 124 is then received and diffracted by the reflective grating 125. The various wavelength components (e.g., components 152, 154, 156) in the collimated light beam 124 are angularly resolved by the reflective grating 125 into angularly resolved light beams 126. Within the angularly resolved light beams 126, different wavelength components are dispersed into different directions. In an exemplary embodiment, wavelength component 152 comprises a wavelength range of about 470 nm to about 480 nm (e.g., blue light) and is dispersed towards a detection element of the linear multichannel array detector 128 configured for receiving blue light. In a further aspect of the exemplary embodiment, wavelength component 154 comprises a wavelength range of about 505 nm to about 515 nm (e.g., green light) and is dispersed towards a detection element of detector 128 configured for receiving green light, and wavelength component 156 comprises a wavelength range of about 645 nm to about 655 nm (e.g., red light) and is dispersed towards a detection element of detector 128 configured for receiving red light.

Continuing the operation of the exemplary embodiment, the different wavelength components in the angularly resolved beams 126 are then focused by an optical device such as the focus mirror 127 onto different independent detection elements of the linear multichannel array detector 128 such that angularly resolved beams 126 are received by the detection elements of linear multichannel array detector 128. The different independent detection elements of the array detector 128 then convert the light power of the different wavelength components into different photocurrent signals 130. In an embodiment, the multichannel linear array detector 128 comprises independent detectors. The photocurrent signals 130 from the independent detector channels of the array detector 128 are converted by the low-noise preamplifier system 132 into the corresponding independent voltage signals 134. The voltage signals 134 are sent into the low-noise differential voltage analyzer 136 in which the noise reduction, as further described herein, is carried out.

The differential voltage signals 138, with significantly lower noise, are sent to the digitizer 140. The digitized signals 142 are then collected by the computing device 150.

In an embodiment, system 100 may be integrated into the device structure of CCD-based detectors with minor or no change in optical configuration. For example, system 100 may be integrated into the USB2000 model detector manufactured by Ocean Optics, Inc. Aspects of multichannel ultra-sensitive optical detection system 100 provide a solution combines advantages of CCD-based detectors with the benefit of higher sensitivity (e.g., 50 to 100 fold higher detection sensitivity over conventional detectors).

Figure 2:
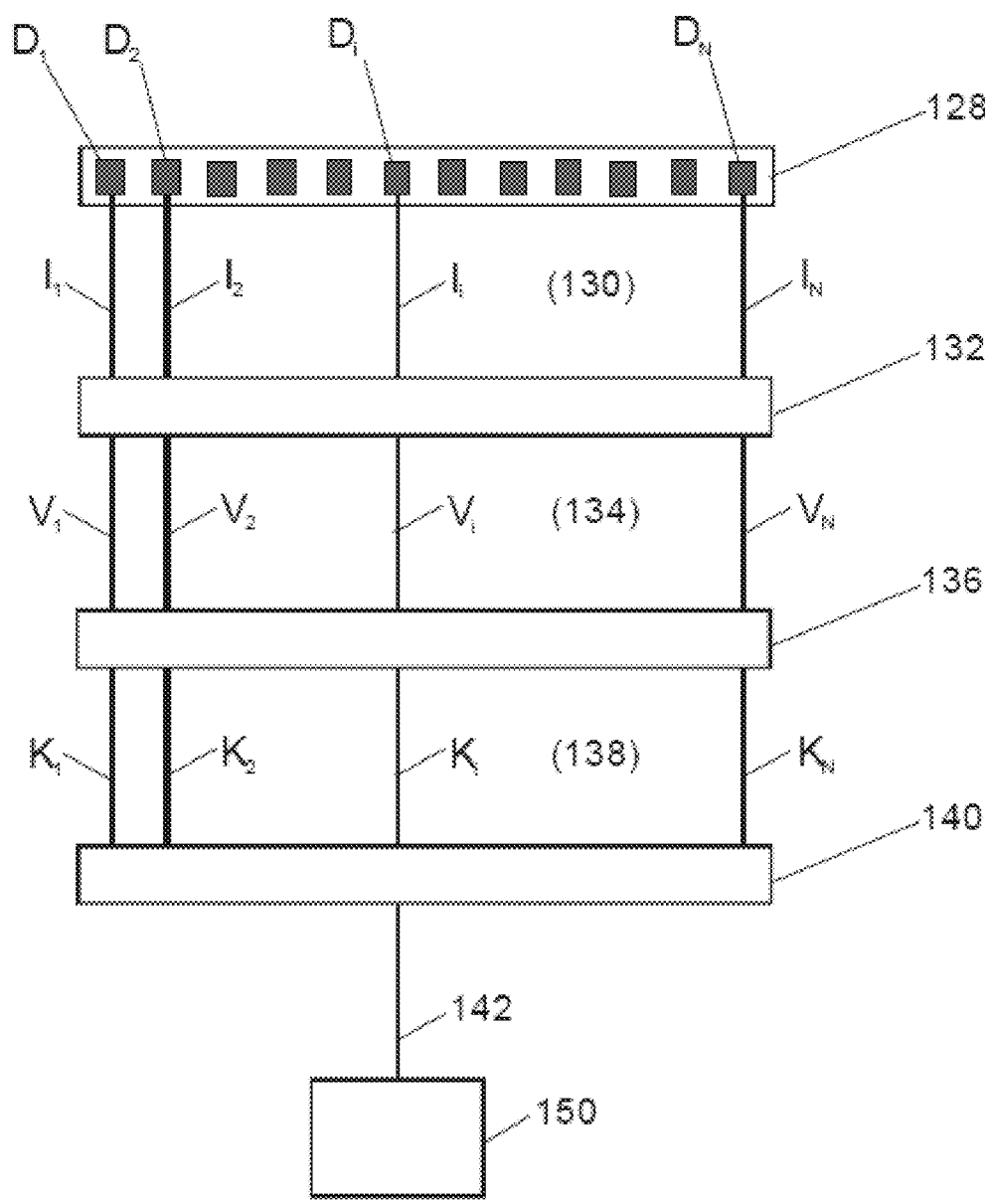
FIG. 2 illustrates further details of the detection system of FIG. 1.

FIG. 2 further illustrates aspects of the system 100. In this embodiment, the array detector 128 includes N total independent detection elements: $D_1, D_2, \ldots D_i, \ldots D_N$. When the array detector 128 is used with the optical configuration of system 100 (FIG. 1), the independent detection elements $D_1, D_2, \ldots D_i, \ldots D_N$ collect different wavelength components of the angularly resolved beams 126 (e.g., $\lambda_1, \lambda_2, \ldots \lambda_i, \ldots \lambda_N$, respectively), and generate corresponding photocurrent signals 130 (e.g., $I_1, I_2, \ldots I_i, \ldots I_N$, respectively). The photocurrent signals 130 are then converted by the low-noise preamplifier system 132 into corresponding independent voltage signals 134 (e.g., $V_1, V_2, \ldots V_i, \ldots V_N$, respectively). The independent voltage signals 134 (e.g., $V_1, V_2, \ldots V_i, \ldots V_N$, respectively) are then sent to the differential voltage analyzer 136, which generates corresponding independent differential voltage signals 138 (e.g., $K_1, K_2, \ldots K_i, \ldots K_N$, respectively). The generation of the independent differential voltage signals 138 by the differential voltage analyzer 136 is accomplished according to Equation 3:

$$K_i = b_i(a_i V_i - V_j), 1 \le i \ne j \le N \quad (3)$$

in which $b_i$ is a proportional constant corresponding to $V_i$, $a_i$ is the cancellation coefficient corresponding to $V_i$, and $V_j$ is a reference voltage, and the corresponding reference wavelength $\lambda_j$ is selected from a wavelength region where the optical absorption of the sample 104 is negligible. For the reference voltage $V_j$ of Equation 3, the output of the differential voltage analyzer 136 is identical to the input voltage, as indicated by Equation 4:

$$K_j = V_j \quad (4)$$

In order to optimize the effect of noise reduction, the value of the differential voltage $K_i$ is minimized by adjusting the value of the cancellation coefficient $a_i$. The degree of noise reduction is evaluated using the ratio of Equation 5:

$$R_i = b_i V_j / K_i \quad (5)$$

For example, $R_i = 20$ corresponds to a 20-fold reduction in common mode light noise received by the detector array 128.

Figure 3:
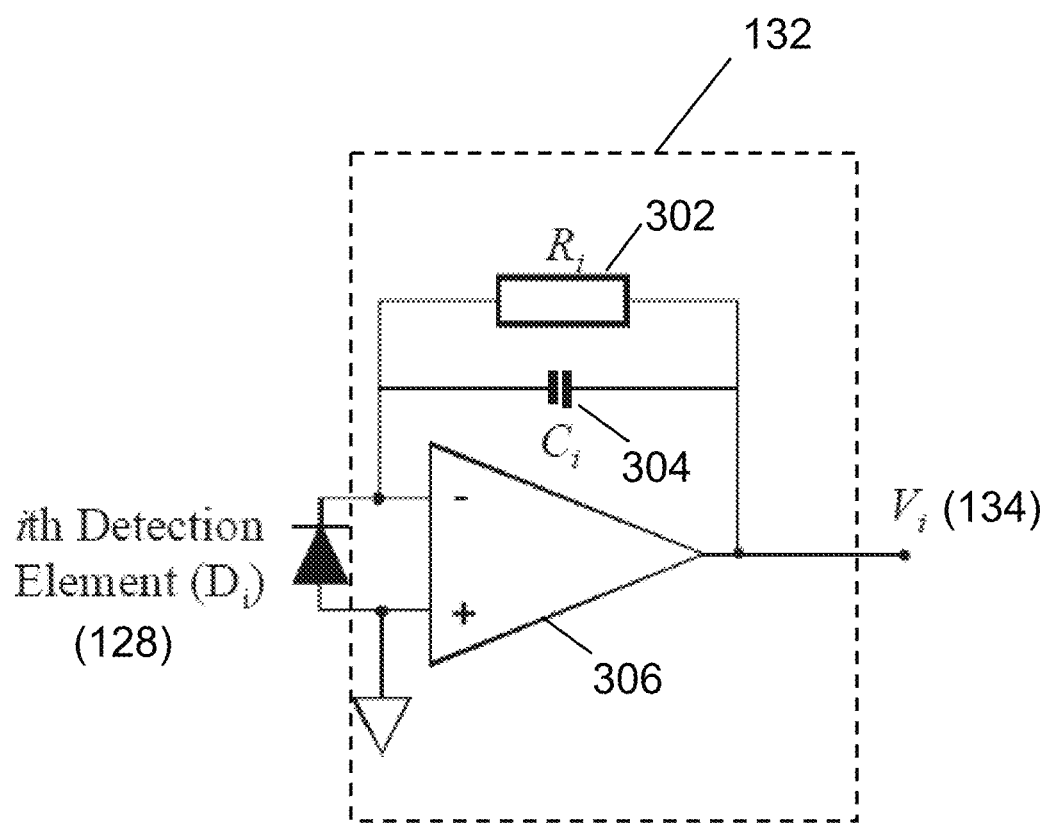
FIG. 3 is a schematic diagram of a low-noise preamplifier circuit.

FIG. 3 illustrates a schematic diagram of an exemplary embodiment of low-noise preamplifier system 132 for converting independent photocurrent signal $I_j$, generated by the ith independent detection element ($D_i$ in FIG. 2) of the array detector 128 into independent voltage signal $V_i$. The system 132 includes a resistor 302, a capacitor 304, and an operational amplifier (i.e., op-amp) 306. The non-inverting input of the op-amp is connected to ground. The inverting input of the op-amp is connected to the output of the ith detection element. The resistor 302 and the capacitor 304 are each connected in parallel with each other and the inverting input and output of the op-amp.

Figure 4:
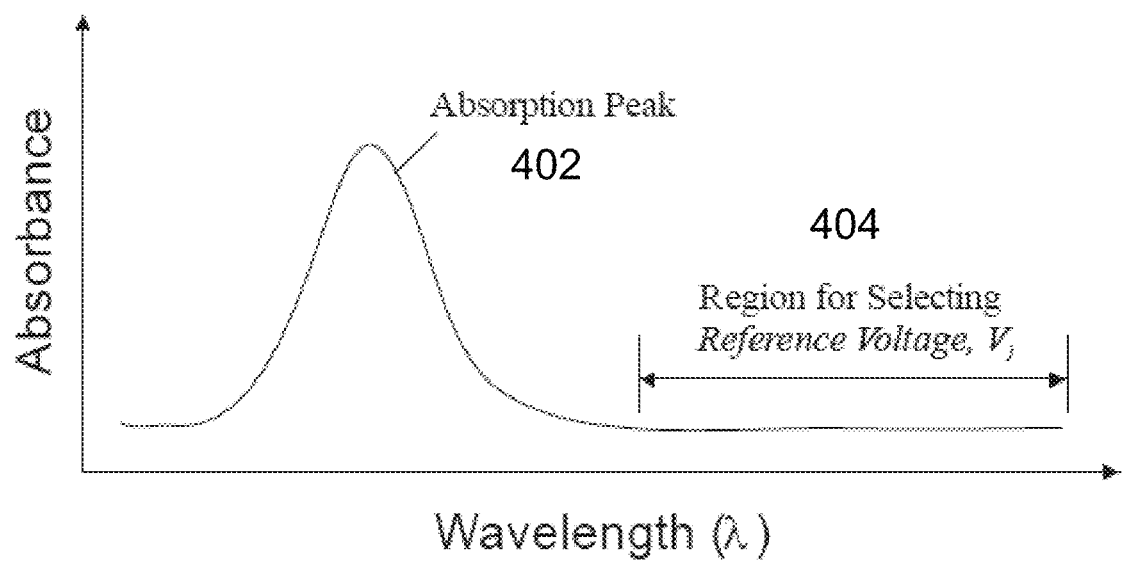
FIG. 4 illustrates a profile of an optical absorption of a sample.

FIG. 4 illustrates an exemplary profile of the absorption of the sample 104. In the illustrated profile, the wavelength of excitation light beam 102 is represented along the x-axis and the absorbance of excitation light beam 102 by sample 104 is represented along the y-axis. The profile illustrates that as the wavelength increases, the absorption peaks in the region generally indicated at 402, and then becomes negligible in the region generally indicated at 404. The region 404 where the optical absorption of sample 104 is negligible indicates wavelengths from which the reference voltage $V_j$ (Equation 3) should be selected.

Figure 5:
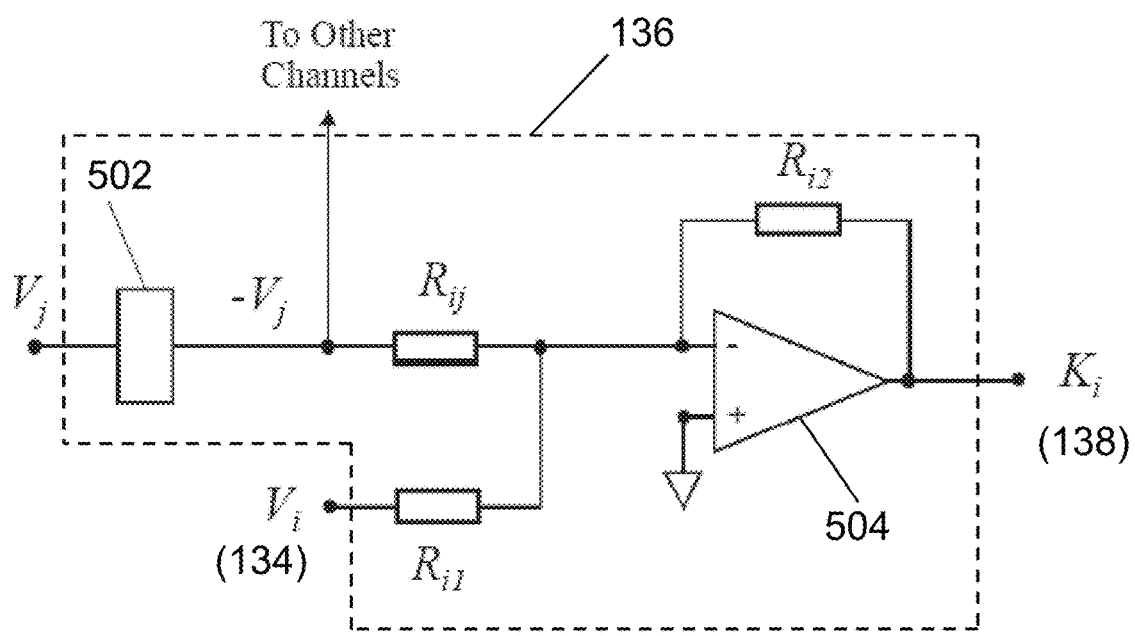
FIG. 5 is a schematic diagram of an exemplary differential voltage analyzer circuit.

FIG. 5 illustrates a schematic diagram of an exemplary embodiment of differential voltage analyzer 136. The differential voltage analyzer 136 includes a voltage inverter 502, a first resistor $R_{ij}$, a second resistor $R_{i1}$, a third resistor $R_{i2}$, and an op-amp 504. The voltage inverter 502 receives reference voltage $V_j$ as an input and inverts it into voltage $-V_j$. The voltage $-V_j$ is outputted to other channels and to the inverting input of op-amp 504 via first resistor $R_{ij}$. The independent voltage signal $V_i$ (134) is connected to the inverting input of op-amp 504 via second resistor $R_{i1}$. The non-inverting input of op-amp 504 is connected to ground. The third resistor $R_{i2}$ is connected in parallel with op-amp 504 (i.e., between the inverting input of op-amp 504 and the output of op-amp 504). For the ith channel corresponding to $V_i$, the output $K_i$ (138) from differential voltage analyzer 136 is expressed by Equations 6, 7, and 8:

$$K_i = b_i(a_i V_i - V_j), 1 \le i \ne j \le N \quad (6)$$

$$b_i = -R_{i2}/R_{ij} \quad (7)$$

$$a_i = R_{ij}/R_{i1} \quad (8)$$

As described above, the value of the differential voltage $K_i$ is minimized by adjusting the value of the cancellation coefficient $a_i$. In other words, $K_i$ is minimized by adjusting the ratio between first resistor $R_{ij}$ and second resistor $R_{i1}$.

Figure 6:
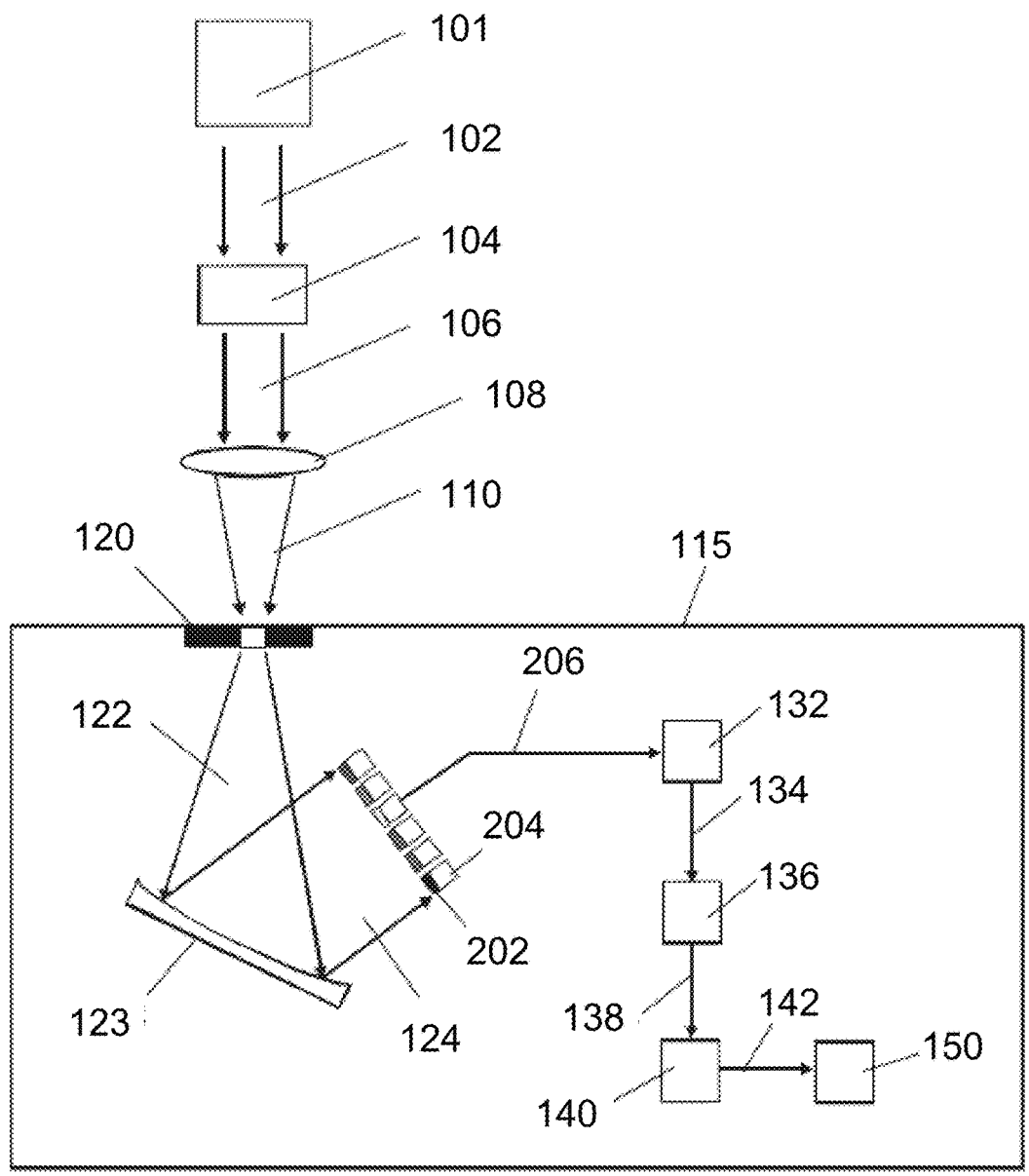
FIG. 6 illustrates an embodiment of a multichannel ultra-sensitive optical detection system including a reflective collimation mirror, interference light filters, an array of independent light detectors, and a differential voltage analyzer.

FIG. 6 depicts a multichannel ultra-sensitive optical detection system 200. The system 200 includes the light source 101, the excitation light beam 102, the sample 104, light 106, the lens 108, the beam 110, and the detector 115. The detector 115 further includes entrance slit 120, light 122, reflective collimation mirror 123, a collimated light beam 124, interference light filters 202, light detectors 204, photocurrent signals 206, low-noise preamplifier system 132, voltage signals 134, low-noise differential voltage analyzer 136, differential voltage signals 138, digitizer 140, digitized signals 142, and computing device 150.

In operation of an exemplary embodiment of system 200, light source 101 generates excitation light beam 102. The excitation light beam 102 interacts with sample 104. For example, such interaction may include all or a portion of excitation light beam 102 being transmitted through, emitted from, scattered by, and/or reflected by sample 104. The portion of light beam 102 transmitted through, emitted from, scattered by, and/or reflected by sample 104 comprises light 106. Light 106 is collected by lens 108. At least a portion of light 106 collected by lens 108 is converted by lens 108 into the beam 110 and focused onto the entrance slit 120. In an alternative embodiment, light 106 is coupled into the detector 115 via a fiber optical connection (not shown). After passing through the entrance slit 120, the light that comprised beam 110 is now referred to as light 122. Light 122 is collected (i.e. received) by an optical device such as the reflective collimation mirror 123 and becomes the collimated light beam 124. In an alternative embodiment, a collimation lens replaces reflective collimation mirror 123. The collimated light beam 124 then passes an array of interference light filters 202 and is collected by an array of independent light detectors 204. In an embodiment, the array of interference light filters 202 includes filters for red light, orange light, yellow light, green light, blue light, violet light, and/or combinations thereof. Each independent light detector in the array 204 of light detectors detects a specific wavelength of the collimated light beam 124 as defined by the corresponding interference light filter 202 in front of the detector. The photocurrent signals 206 from the independent detectors of the array 204 are converted by the low-noise preamplifier system 132 into the corresponding independent voltage signals 134. The voltage signals 134 are sent into low-noise differential voltage analyzer 136 in which the noise reduction is carried out. The differential voltage signals 138, with significantly lower noise, are sent to digitizer 140. The digitized signals 142 are then collected by computing device 150.

Figure 7:
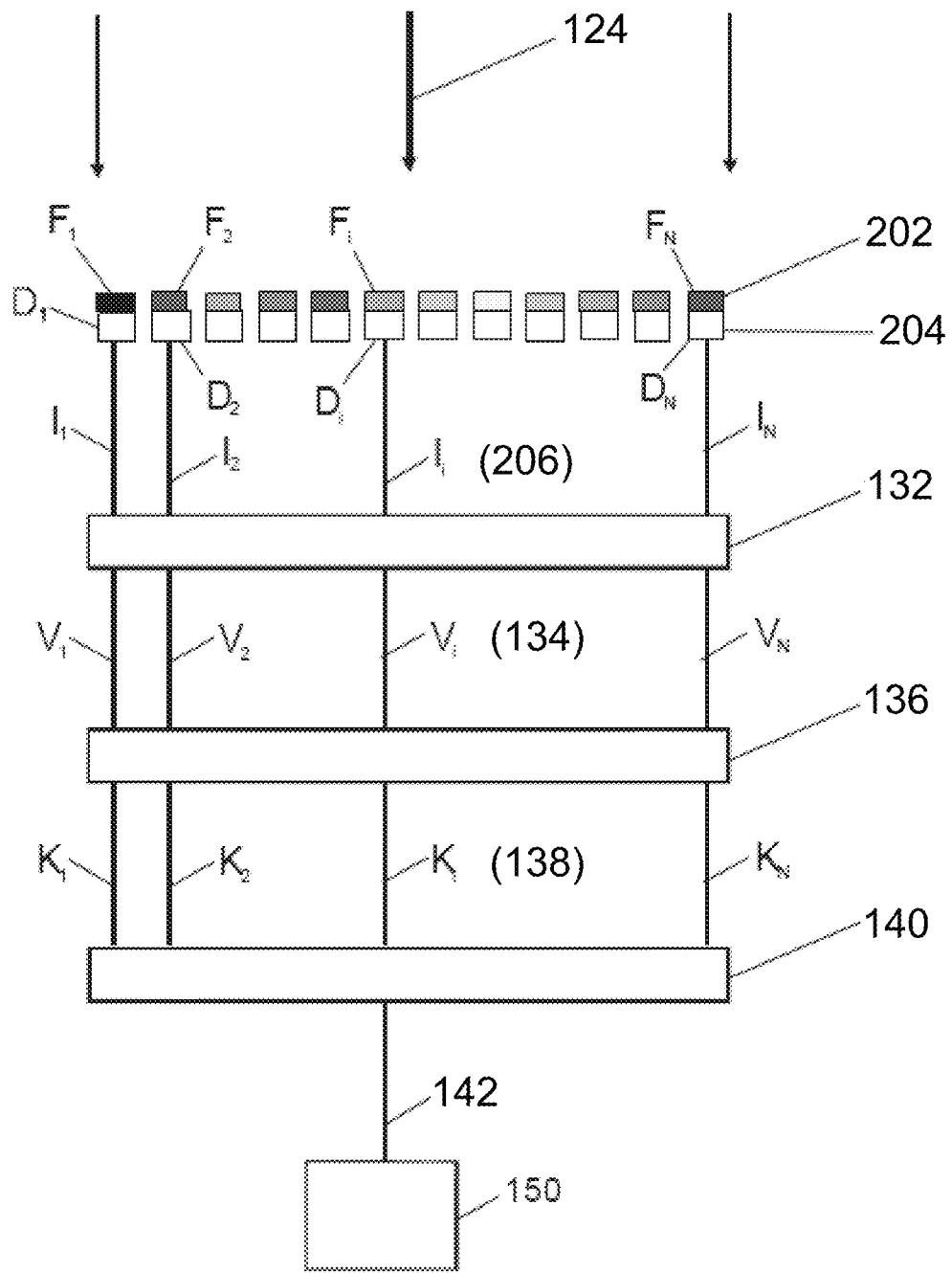
FIG. 7 illustrates further details of the detection system of FIG. 6.

FIG. 7 further illustrates aspects of system 200. In this embodiment, there are N total interference light filters $F_1$, $F_2$, ... $F_i$, ... $F_N$ in the interference filter array 202 and N total independent light detectors $D_1$, $D_2$, ... $D_i$, ... $D_N$ in the array of detectors 204, respectively. Under the optical configuration of system 200 (FIG. 6), the independent light detectors $D_1$, $D_2$, ... $D_i$, ... $D_N$ of the array 204 each collect different wavelength components of the collimated light beam 124 (e.g., $\lambda_1$, $\lambda_2$, ... $\lambda_i$, ... $\lambda_N$, respectively), as defined by the corresponding interference filters (e.g., $F_1$, $F_2$, ... $F_i$, ... $F_N$, respectively). The independent light detectors $D_1$, $D_2$, ... $D_i$, ... $D_N$ of the array 204 each generate corresponding photocurrent signals 206 (e.g., $I_1$, $I_2$, ... $I_i$, ... $I_N$, respectively). The photocurrent signals 206 are then converted by the low-noise preamplifier system 132 into corresponding independent voltage signals 134 (e.g., $V_1$, $V_2$, ... $V_i$, ... $V_N$, respectively). Details regarding low-noise preamplifier system 132 are further described herein (e.g., FIG. 3 and accompanying description).

Referring again to the embodiment of FIG. 7, the independent voltage signals 134 (e.g., $V_1$, $V_2$, ... $V_i$, ... $V_N$, respectively) are then sent to the differential voltage analyzer 136, which generates corresponding independent differential voltage signals 138 (e.g., $K_1$, $K_2$, ... $K_i$, ... $K_N$, respectively). The generation of the independent differential voltage signals 138 by the differential voltage analyzer 136 is accomplished according to Equation 3, as further described herein. In an exemplary embodiment, the filter-based configuration of system 200 provides additional flexibility over the grating-based configuration of system 100 in selecting reference wavelength $\lambda j$. For the reference voltage $V_j$ of Equation 3, the output of the differential voltage analyzer 136 is identical to the input voltage, as indicated by Equation 4 herein. In order to optimize the effect of noise reduction, the value of the differential voltage $K_i$ is minimized by adjusting the value of the cancellation coefficient $\alpha_i$. The degree of noise reduction is evaluated using the ratio $R_i$ of Equation 5, as further described herein. For example, $R_i=20$ corresponds to a 20-fold reduction in common mode light noise received by the detector array 204. Details regarding differential voltage analyzer 136 are further described herein (e.g., FIG. 5 and accompanying description).

In an embodiment, system 200 may be integrated into the device structure of CCD-based detectors with minor or no change in optical configuration. For example, system 200 may be integrated into the USB2000 model detector manufactured by Ocean Optics, Inc. Aspects of multichannel ultra-sensitive optical detection system 200 provide a solution combines advantages of CCD-based detectors with the benefit of higher sensitivity (e.g., 50 to 100 fold higher detection sensitivity over conventional detectors). In an embodiment, selection of reference wavelength $\lambda_j$ for system 200 is straightforward due to the flexibility in selecting filters 202 suitable for different applications.

Figure 8:
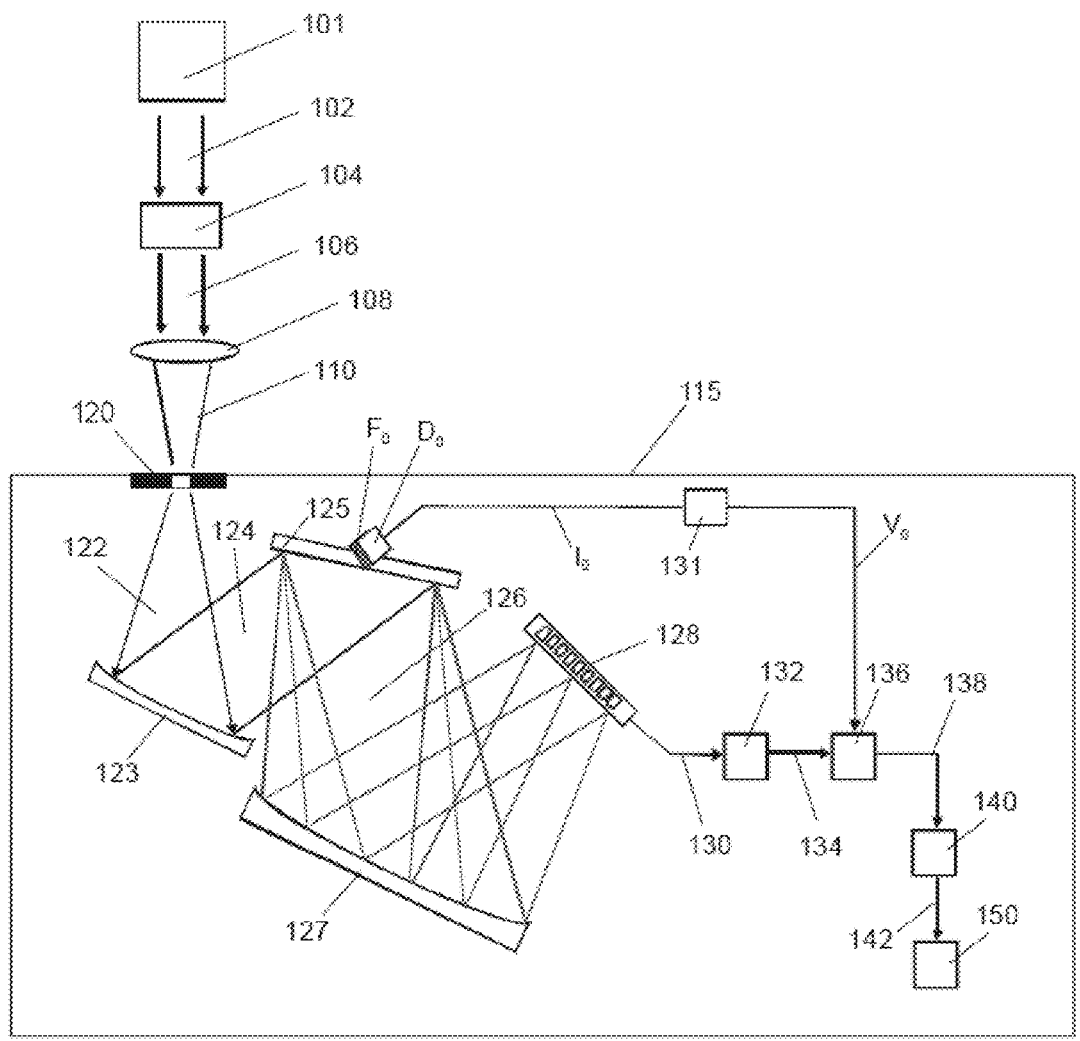
FIG. 8 illustrates an embodiment of a multichannel ultra-sensitive optical detection system including a grating, a reference detector, a linear multichannel array detector, and a differential voltage analyzer.

FIG. 8 depicts a multichannel ultra-sensitive optical detection system 300. The system 300 includes the light source 101, the excitation light beam 102, the sample 104, light 106, the lens 108, the beam 110, and the detector 115. The detector 115 further includes entrance slit 120, light 122, reflective collimation mirror 123, collimated light beam 124, reflective grating 125, a reference detector $D_0$, a filter $F_0$, angularly resolved light beams 126, focus mirror 127, linear multichannel array detector 128, reference photocurrent signal $I_0$, photocurrent signals 130, a low-noise preamplifier system 131, low-noise preamplifier system 132, reference voltage signal $V_0$, voltage signals 134, low-noise differential voltage analyzer 136, differential voltage signals 138, digitizer 140, digitized signals 142, and computing device 150.

In operation of an exemplary embodiment of system 300, light source 101 generates excitation light beam 102. The excitation light beam 102 interacts with sample 104. For example, such interaction may include all or a portion of excitation light beam 102 being transmitted through, emitted from, scattered by, and/or reflected by sample 104. The portion of light beam 102 transmitted through, emitted from, scattered by, and/or reflected by sample 104 comprises light 106. Light 106 is collected by lens 108. At least a portion of light 106 collected by lens 108 is converted by lens 108 into beam 110 and focused onto entrance slit 120 mounted on detector 115. In an alternative embodiment, light 106 is coupled into detector 115 via a fiber optical connection (not shown). After passing through the entrance slit 120, the light that comprised beam 110 is now referred to as light 122. Light 122 is collected (i.e., received) by an optical device such as the reflective collimation mirror 123 and becomes the collimated light beam 124. The collimated light beam 124 is then received and diffracted by the reflective grating 125. The various wavelength components in the collimated light beam 124 are angularly resolved by the reflective grating 125 into angularly resolved light beams 126. Within the angularly resolved light beams 126, different wavelength components are dispersed into different directions.

Continuing the operation of the exemplary embodiment of system 300 illustrated by FIG. 8, the different wavelength components in angularly resolved beams 126 are then focused by an optical device such as focus mirror 127 onto different independent detection elements of linear multichannel array detector 128. The different independent detection elements of array detector 128 then convert the light power of the different wavelength components into different photocurrent signals 130. In an embodiment, multichannel linear array detector 128 comprises independent detectors. The photocurrent signals 130 from the independent detector channels of array detector 128 are converted by low-noise preamplifier system 132 into corresponding independent voltage signals 134. The voltage signals 134 are sent into low-noise differential voltage analyzer 136 in which the noise reduction is carried out. The differential voltage signals 138, with significantly lower noise, are sent to digitizer 140. The digitized signals 142 are then collected by computing device 150.

Figure 9:
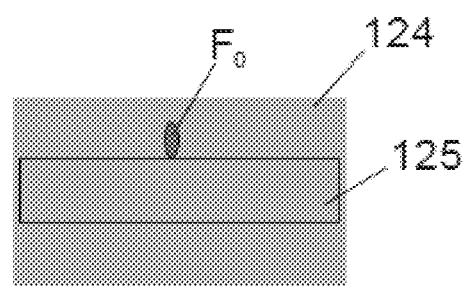
FIG. 9 illustrates further details of the reference detector of FIG. 8.

In an embodiment, the dimension of reflective collimation mirror 123, in the direction perpendicular to the plan of the dispersion, is larger than the width of reflective grating 125 in that direction. Accordingly, collimated light beam 124 overfills reflective grating 125, as illustrated by FIG. 9.

Referring again to FIG. 8, reference detector $D_0$, with filter $F_0$ placed in front of the detector $D_0$ for selecting proper reference wavelength $\lambda_0$, is placed at the edge of reflective grating 125 for collecting a portion of collimated light beam 124 at normal incidence. The reference photocurrent signal $I_0$ produced by reference detector $D_0$ is converted by low-noise preamplifier 131 into reference voltage signal $V_0$. In an embodiment, low-noise amplifier 131 operates in the same manner as low-noise preamplifier system 132, as further described herein. The reference voltage signal $V_0$ is also sent to low-noise differential voltage analyzer 136 for noise reduction operation.

Figure 10:
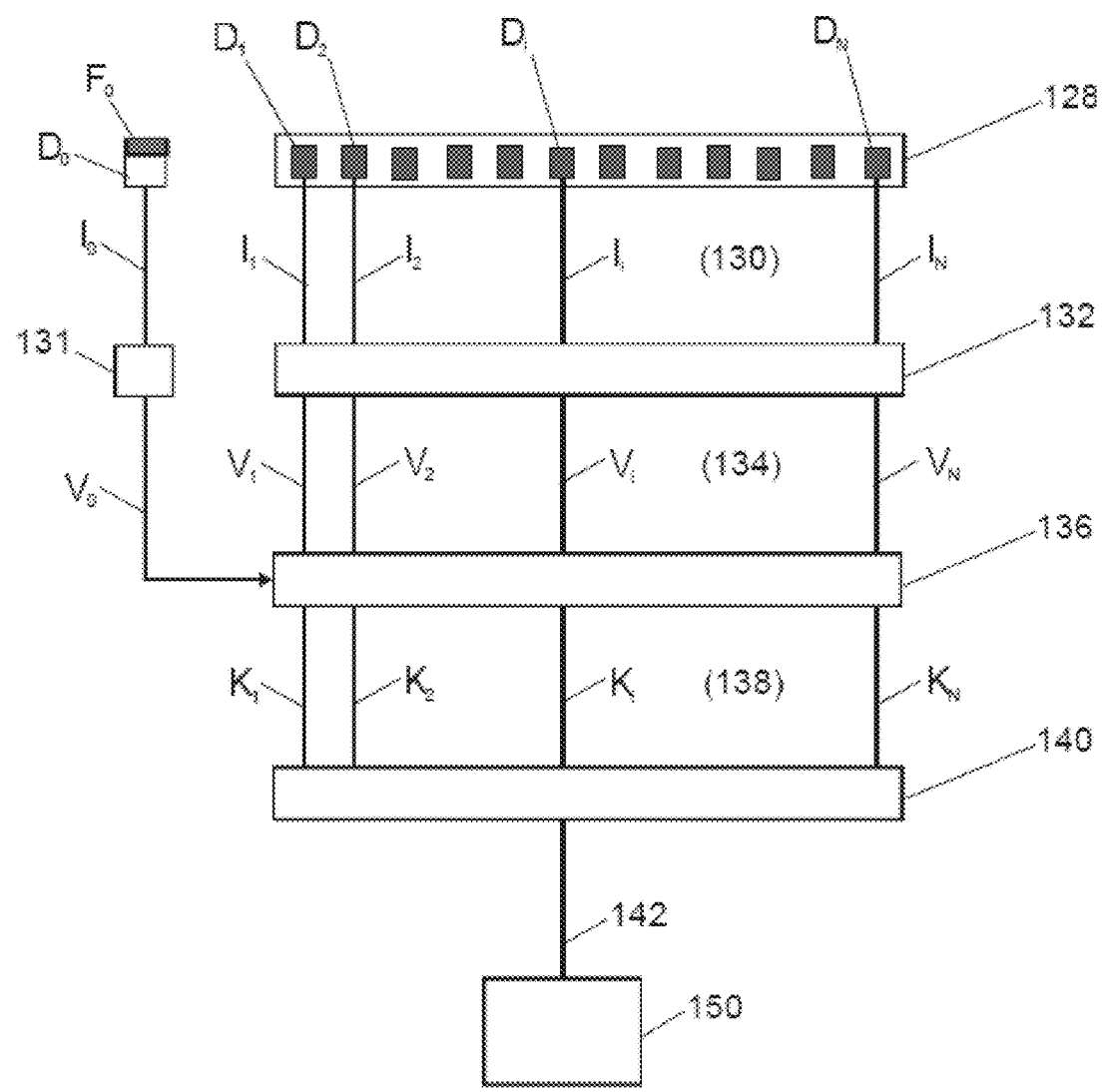
FIG. 10 illustrates further details of the detection system of FIG. 8.

FIG. 10 further illustrates aspects of the system 300. In this embodiment, the array detector 128 includes N total independent detection elements: $D_1, D_2, \ldots D_i, \ldots D_N$. When the array detector 128 is used with the optical configuration of system 300 (FIG. 8), the independent detection elements $D_1, D_2, \ldots D_i, \ldots D_N$ collect different wavelength components of the angularly resolved beams 126 (e.g., $\lambda_1, \lambda_2, \ldots \lambda_i, \ldots \lambda_N$, respectively), and generate corresponding photocurrent signals 130 (e.g., $I_1, I_2, \ldots I_i, \ldots I_N$, respectively). The photocurrent signals 130 are then converted by the low-noise preamplifier system 132 into corresponding independent voltage signals 134 (e.g., $V_1, V_2, \ldots V_i, \ldots V_N$, respectively). Details regarding low-noise preamplifier system 132 are further described herein (e.g., FIG. 3 and accompanying description). The circuit illustrated in FIG. 3 may also be used for converting the reference current $I_0$ into the reference voltage $V_0$ in the embodiment of system 300.

Referring again to the embodiment of FIG. 10, the independent voltage signals 134 (e.g., $V_1, V_2, \ldots V_i, \ldots V_N$, respectively) are then sent to the differential voltage analyzer 136, which generates corresponding independent differential voltage signals 138 (e.g., $K_1, K_2, \ldots K_i, \ldots K_N$, respectively). The generation of the independent differential voltage signals 138 by the differential voltage analyzer 136 in system 300 is accomplished according to Equation 9:

$$K_i = b_i(a_i V_i - V_0), 1 \leq i \leq N \quad (9)$$

in which $b_i$ is a proportional constant corresponding to $V_i$, $a_i$ is the cancellation coefficient corresponding to $V_i$, and $V_0$ is a reference voltage selected from a wavelength region where the optical absorption of the sample 104 is negligible. In an embodiment, selecting the reference wavelength $\lambda_0$ is accomplished by selecting proper filter $F_0$. In order to optimize the effect of noise reduction, the value of the differential voltage $K_i$ is minimized by adjusting the value of the cancellation coefficient $\alpha_i$. The degree of noise reduction is evaluated using the ratio of Equation 10:

$$R_i = b_i V_0 / K_i \quad (10)$$

For example, $R_i = 20$ corresponds to a 20-fold reduction in common mode light noise received by the detector array 128.

In an embodiment, system 300 may be integrated into the device structure of CCD-based detectors with minor or no change in optical configuration. For example, system 300 may be integrated into the USB2000 model detector manufactured by Ocean Optics, Inc. Aspects of multichannel ultra-sensitive optical detection system 300 provide a solution combines advantages of CCD-based detectors with the benefit of higher sensitivity (e.g., 50 to 100 fold higher detection sensitivity over conventional detectors). In an embodiment, system 300 provides the grating-based device configuration of system 100 with the flexibility in reference wavelength selection provided by the filter-based configuration of system 200.

Figure 11:
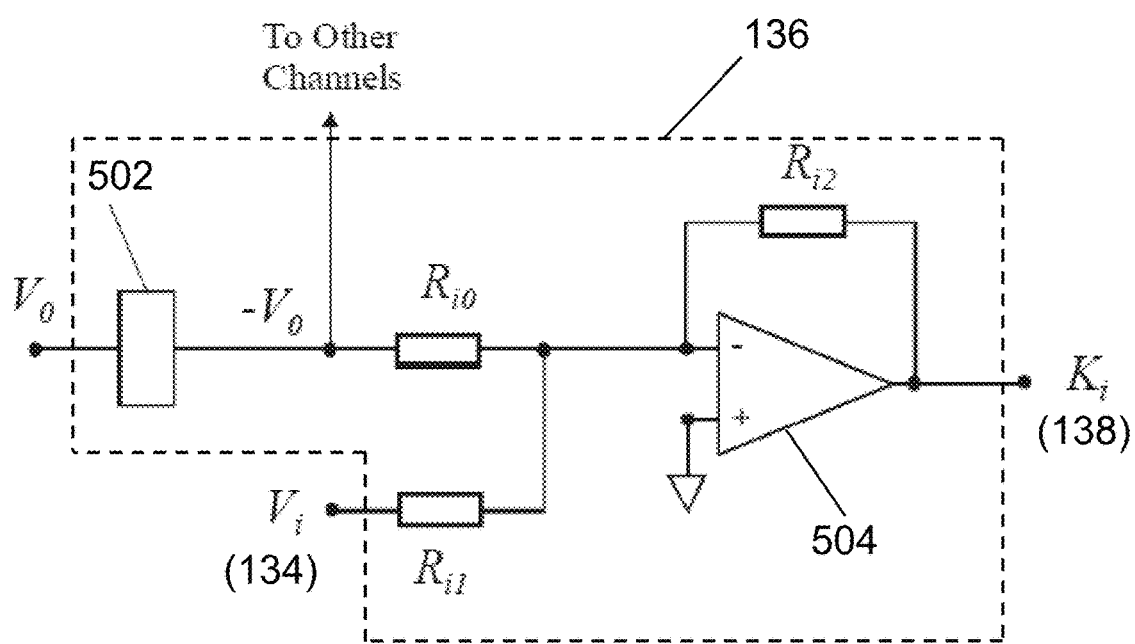
FIG. 11 is a schematic diagram of another exemplary differential voltage analyzer circuit.

FIG. 11 illustrates a schematic diagram of another exemplary embodiment of differential voltage analyzer 136. This embodiment of differential voltage analyzer 136 includes voltage inverter 502, a first resistor $R_{i0}$, second resistor $R_{i1}$, third resistor $R_{i2}$, and op-amp 504. The voltage inverter 502 receives reference voltage $V_0$ as an input and inverts it into voltage $-V_0$. The voltage $-V_0$ is outputted to other channels and to the inverting input of op-amp 504 via first resistor $R_{i0}$. The independent voltage signal $V_i$ (134) is connected to the inverting input of op-amp 504 via second resistor $R_{i1}$. The non-inverting input of op-amp 504 is connected to ground. The third resistor $R_{i2}$ is connected in parallel with op-amp 504 (i.e., between the inverting input of op-amp 504 and the output of op-amp 504). For the ith channel corresponding to $V_i$, the output $K_i$ (138) from differential voltage analyzer 136 is expressed by Equations 11, 12, and 13:

$$K_i = b_i(a_i V_i - V_0), 1 \leq i \leq N \quad (11)$$

$$b_i = -R_{i2}/R_{i0} \quad (12)$$

$$a_i = R_{i0}/R_{i1} \quad (13)$$

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:
1. A system, comprising:
   a reflective grating configured to angularly resolve a collimated light beam and permit selection of a reference wavelength from a wavelength region in which optical absorption of a sample is negligible, wherein the reference wavelength corresponds to a reference voltage for use by a differential voltage analyzer;
   an optical device coupled to the reflective grating and configured to receive and focus the angularly resolved light beam;
   a multichannel array detector configured to receive the focused light beam and output signals representative of a plurality of wavelength components of the light beam;
   a low-noise preamplifier coupled to the multichannel array detector and configured to convert the signals outputted by the multichannel array detector into independent voltage signals, wherein the independent voltage signals correspond to a cancellation coefficient and a proportional constant; and
   a differential voltage analyzer coupled to the low-noise preamplifier and configured to generate a differential voltage signal representative of each of the wavelength components relative to a noise reduction reference value, wherein the differential voltage signal is based on the independent voltage signals, the reference voltage, the cancellation coefficient, and the proportional constant.

2. The system of claim 1, further comprising a collimation mirror configured to reflect the collimated light beam toward the reflective grating.

3. The system of claim 1, wherein the optical device for receiving and focusing the angularly resolved light beam comprises a focus mirror configured to reflect the angularly resolved light beam toward the multichannel array detector.

4. The system of claim 1, further comprising a reference detector having a filter attached thereto, wherein the reference detector is configured to collect at least a portion of the collimated light beam at normal incidence.

5. The system of claim 1, wherein the collimated light beam is formed at least in part by electromagnetic radiation emitted from a light source interacting with a sample by one or more of the following: the electromagnetic radiation is transmitted through the sample, the electromagnetic radiation is emitted from the sample, the electromagnetic radiation is scattered by the sample, and the electromagnetic radiation is reflected by sample.

6. The system of claim 1, wherein the differential voltage is minimized by adjusting the value of the cancellation coefficient.

7. The system of claim 1, wherein the differential voltage analyzer includes a voltage inverter, a first resister, a second resistor, a third resistor, and an operation amplifier, wherein the voltage inverter is configured to invert the reference voltage and output the inverted reference voltage to other channels and an inverting input of the operation amplifier via the first resistor, and wherein the independent voltage signal is connected to the inverting input of the operation amplifier via the second resistor, a non-inverting input of the operational amplifier is connected to ground, and the third resistor is connected in parallel with the operational amplifier.

8. The system of claim 7, wherein the differential voltage is minimized by adjusting a ratio between the first resistor and the second resistor.

9. A system, comprising:
an optical device configured to collimate a light beam;
one or more interference light filters each configured to receive the collimated light beam and selectively transmit one of a plurality of wavelength components of the light beam, wherein each of the one or more interference light filters are configured to permit selection of a reference wavelength from a wavelength region in which optical absorption of a sample is negligible, wherein the reference wavelength corresponds to a reference voltage for use by a voltage analyzer;
a plurality of light detectors each configured to receive one of the plurality of wavelength components of the light beam and output a photocurrent signal representative of the received wavelength component, wherein the one or more light detectors are independent with respect to each other;
a low-noise preamplifier coupled to the light detectors to convert the photocurrent signals outputted by the light detectors into independent voltage signals, wherein the independent voltage signals correspond to a cancellation coefficient and a proportional constant; and
a differential voltage analyzer coupled to the low-noise preamplifier and configured to generate a differential voltage signal representative of each of the wavelength components relative to a noise reduction reference value, wherein the differential voltage signal is based on the independent voltage signals, the reference voltage, the cancellation coefficient, and the proportional constant.

10. The system of claim 9, wherein the optical device is a collimation mirror.

11. The system of claim 9, wherein the optical device is a collimation lens.

12. The system of claim 9, wherein the collimated light beam is formed at least in part by electromagnetic radiation emitted from a light source interacting with a sample by one or more of the following: the electromagnetic radiation is transmitted through the sample, the electromagnetic radiation is emitted from the sample, the electromagnetic radiation is scattered by the sample, and the electromagnetic radiation is reflected by sample.

13. The system of claim 9, wherein the differential voltage is minimized by adjusting the value of the cancellation coefficient.

14. The system of claim 9, wherein the differential voltage analyzer includes a voltage inverter, a first resister, a second resistor, a third resistor, and an operation amplifier, wherein the voltage inverter is configured to invert the reference voltage and output the inverted reference voltage to other channels and an inverting input of the operation amplifier via the first resistor, and wherein the independent voltage signal is connected to the inverting input of the operation amplifier via the second resistor, a non-inverting input of the operational amplifier is connected to ground, and the third resistor is connected in parallel with the operational amplifier.

15. The system of claim 14, wherein the differential voltage is minimized by adjusting a ratio between the first resistor and the second resistor.

16. A method of identifying one or more properties of a sample material, comprising:
collimating a light beam transmitted through, emitted from, scattered by, and/or reflected by the sample material;
detecting one or more specific wavelengths of light of the collimated light beam;
selecting a reference voltage from a wavelength region in which optical absorption of a sample is negligible, wherein the reference wavelength corresponds to a reference voltage;
generating a corresponding photocurrent signal for each of the specific wavelengths of light;
converting each photocurrent signal into a corresponding independent voltage signal, wherein the independent voltage signal corresponds to at least one of a cancellation coefficient and a proportional constant; and
generating a corresponding independent differential voltage signal for each independent voltage signal based on the proportional constant, the independent voltage signal, the cancellation coefficient, and the reference voltage.

17. The method of claim 16, wherein the reference voltage is representative of a reference wavelength of the one or more specific wavelengths of light of the collimated light beam.

18. The method of claim 16, further comprising angularly resolving the collimated light beam.

19. The method of claim 18, further comprising focusing the angularly resolved light beam and detecting one or more specific wavelengths of light of the angularly resolved light beam.

20. The method of claim 16, wherein the differential voltage analyzer includes a voltage inverter, a first resister, a second resistor, a third resistor, and an operation amplifier, wherein the voltage inverter is configured to invert the reference voltage and output the inverted reference voltage to other channels and an inverting input of the operation amplifier via the first resistor, and wherein the independent voltage signal is connected to the inverting input of the operation amplifier via the second resistor, a non-inverting input of the operational amplifier is connected to ground, and the third resistor is connected in parallel with the operational amplifier.

* * * * *